United States Patent
Sepe, Jr. et al.

(10) Patent No.: US 9,882,380 B2
(45) Date of Patent: Jan. 30, 2018

(54) FOR HYBRID SUPER-CAPACITOR / BATTERY SYSTEMS IN PULSED POWER APPLICATIONS

(71) Applicant: ELECTRO STANDARDS LABORATORIES, Cranston, RI (US)

(72) Inventors: Raymond B Sepe, Jr., Medfield, MA (US); Anton Steyerl, Wakefield, RI (US); Steven Bastien, Exeter, RI (US)

(73) Assignee: ELECTRO STANDARDS LABORATORIES, Cranston, RI (US)

( * ) Notice: Subject to any disclaimer, the term of this patent is extended or adjusted under 35 U.S.C. 154(b) by 873 days.

(21) Appl. No.: 14/279,687

(22) Filed: May 16, 2014

(65) Prior Publication Data
US 2014/0339902 A1 Nov. 20, 2014

Related U.S. Application Data

(60) Provisional application No. 61/824,988, filed on May 17, 2013.

(51) Int. Cl.
| | |
|---|---|
| H02J 1/00 | (2006.01) |
| H02J 3/00 | (2006.01) |
| H02J 1/10 | (2006.01) |
| H02J 7/34 | (2006.01) |
| H02M 3/157 | (2006.01) |
| H02M 3/158 | (2006.01) |
| H02M 1/00 | (2006.01) |
| H02M 3/156 | (2006.01) |

(52) U.S. Cl.
CPC .............. *H02J 1/102* (2013.01); *H02J 7/345* (2013.01); *H02M 3/157* (2013.01); *H02M 3/158* (2013.01); *H02M 3/1584* (2013.01); *H02M 2001/0022* (2013.01); *H02M 2001/0025* (2013.01); *H02M 2003/1566* (2013.01); *Y10T 307/696* (2015.04)

(58) Field of Classification Search
CPC ......... H02M 2001/0025; H02M 3/157; H02M 3/158; H02J 1/102; H02J 7/345; Y10T 307/696
See application file for complete search history.

(56) References Cited

U.S. PATENT DOCUMENTS

| | | | | |
|---|---|---|---|---|
| 5,849,426 | A * | 12/1998 | Thomas | H01M 16/00 361/434 |
| 7,649,344 | B2 * | 1/2010 | Bang | G06F 1/30 320/112 |
| 7,688,021 | B2 * | 3/2010 | Freiman | H02J 7/0068 307/44 |
| 9,422,141 | B2 * | 8/2016 | Foley | B66F 7/0625 |
| 2002/0100462 | A1 * | 8/2002 | Yang | F02D 41/0077 123/568.16 |
| 2004/0095098 | A1 * | 5/2004 | Turner | H02J 7/345 320/167 |
| 2008/0094042 | A1 * | 4/2008 | Ferrario | G03B 15/05 323/234 |

(Continued)

*Primary Examiner* — Rexford Barnie
*Assistant Examiner* — Rasem Mourad
(74) *Attorney, Agent, or Firm* — IP Authority, LLC; Ramraj Soundararajan

(57) ABSTRACT

A hybrid super-capacitor/battery system is disclosed (particularly under high pulsed power and low temperature conditions) which allows an existing battery system to ride through transient loading and provide excellent energy density and power density under practical loading conditions.

23 Claims, 11 Drawing Sheets

(56) References Cited

U.S. PATENT DOCUMENTS

| | | | | |
|---|---|---|---|---|
| 2009/0251933 A1* | 10/2009 | Angerer | ............... | H02M 7/493 363/71 |
| 2009/0284076 A1* | 11/2009 | Lin | ............... | H02J 7/0031 307/66 |
| 2010/0097029 A1* | 4/2010 | McCabe | ............... | B60L 11/005 320/103 |
| 2011/0062785 A1* | 3/2011 | Odland | ............... | H02J 1/10 307/80 |
| 2011/0149611 A1* | 6/2011 | Moussaoui | ............... | H02M 3/33584 363/21.04 |
| 2012/0049772 A1* | 3/2012 | Moussaoui | ............... | H02M 3/1588 318/376 |
| 2014/0125272 A1* | 5/2014 | Weissinger | ............... | H02J 7/0068 320/107 |
| 2014/0181547 A1* | 6/2014 | Hua | ............... | G06F 1/3206 713/320 |

\* cited by examiner

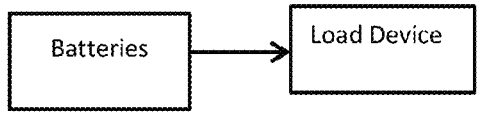
FIG. 9A Existing BA-5590 portable
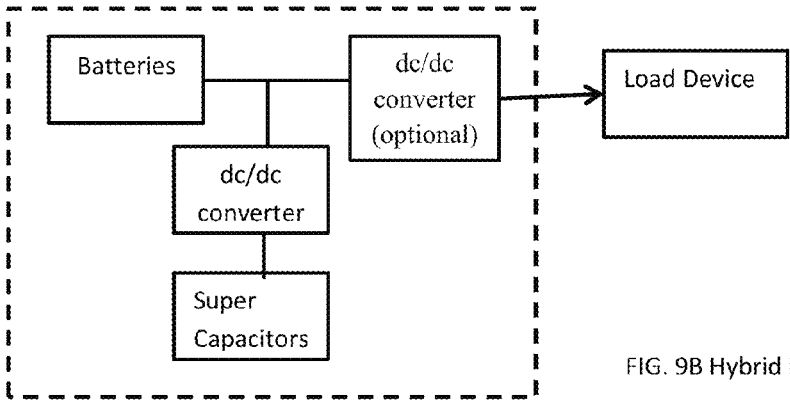
FIG. 9B Hybrid BA-5590
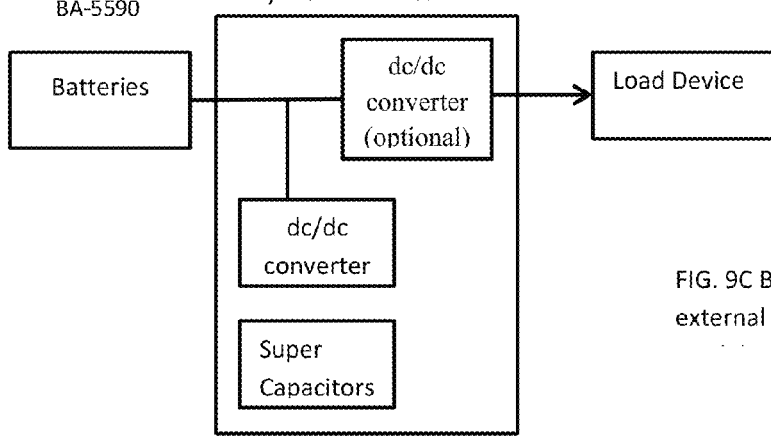
FIG. 9C BA-5590 with external hybridization
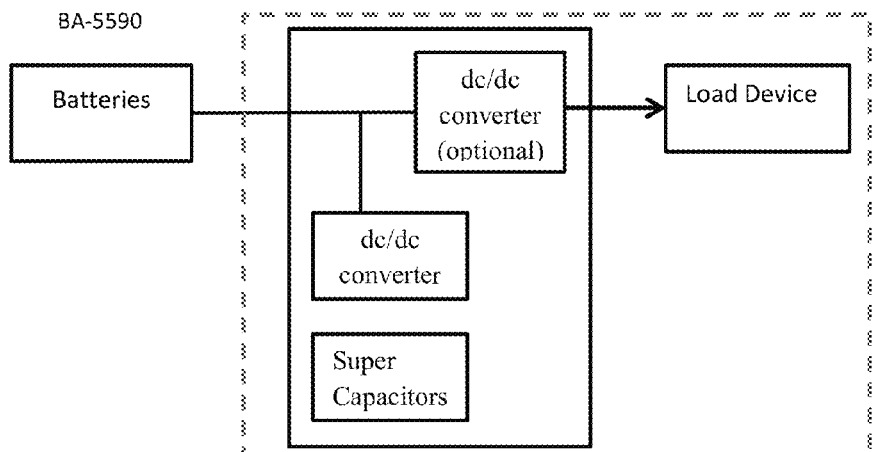
FIG. 9D BA-5590 with hybridization integrated into the load devices

FOR HYBRID SUPER-CAPACITOR / BATTERY SYSTEMS IN PULSED POWER APPLICATIONS

BACKGROUND OF THE INVENTION

Field of Invention

The present invention relates generally to the field of battery systems. More specifically, the present invention is related to a novel design for hybrid super-capacitor/battery systems in pulsed power applications.

Discussion of Related Art

Super-capacitors are specialized low voltage capacitors with very high capacitance in a relatively small size. These devices provide superior energy, power density and capability compared to standardly available capacitors based on older technologies. Several types of super-capacitors are commercially available including Electric Double Layer Capacitors (EDLCs) and Lithium Ion Capacitors (LiCs). Such devices are finding uses in automotive, power backup and consumer electronics applications, and are viable replacements for flywheels in energy-storage and bridge-power systems.

The key advantages of the super-capacitor technology over battery technology are the long lifetime, low leakage and high cycle life, along with much greater pulsed power capability for both charging and discharging. Battery technology still offers better energy storage density than super-capacitors but batteries can't compete with the power density, and lifetime advantages they provide.

Given the complementary capabilities of batteries and super-capacitors, there is a need in pulsed power applications for the incorporation of a hybrid approach using a combination of super-capacitors and batteries to offer the best performance while considering system cost and performance at the same time.

Embodiments of the present invention are an improvement over prior art systems and methods.

SUMMARY OF THE INVENTION

In one embodiment, the present invention discloses a system comprising: a hybrid super-capacitor/battery system comprising a super-capacitor unit comprising one or more super-capacitors and a battery unit comprising one or more battery cells; a DC/DC converter allowing charging and discharging of the super-capacitors; and a power control system comprising an inner voltage control loop comprising a voltage controller and an outer current control loop comprising a current controller, the inner voltage control loop providing control of a load voltage to maintain a commanded value in a required range and regulating the voltage near the battery output voltage, the outer current control loop providing the command value and controlling a current of the battery unit to a profile of set points based on required operating conditions, the set points configured to allow output of the battery unit to be load-leveled and to allow the super-capacitor unit to provide a pulsed power needed by a load. The profiled current set-points can be constant or varying values in response to operating conditions such that the system's performance goals are most readily achieved.

In another embodiment, the present invention provides a system comprising: a hybrid super-capacitor/battery system comprising a super-capacitor unit comprising one or more super-capacitors and a battery unit comprising one or more battery cells, the super-capacitor supplying providing high-power short-duration pulses and the battery unit supplying overall average power and energy demand of a load; a DC/DC converter allowing charging and discharging of the super-capacitors; a power control system comprising an inner voltage control loop comprising a voltage controller and an outer current control loop comprising a current controller, the inner voltage control loop providing control of a load voltage to maintain a commanded value in a required range and regulating the voltage near the battery output voltage, the outer current control loop providing the command value and controlling a current of the battery unit to a profile of set-points based on required operating conditions, the set points configured to allow output of the battery unit to be load-leveled and to allow the super-capacitor unit to provide a pulsed power needed by the load; and a switch controller having a pulse width modulation (PWM) generator that receives from the voltage controller a duty cycle, $D[n]$, where $D[n]$ is used by the PWM generator to generate a switch control signal, $s(t)$, where $s(t)$ is used by the PWM generator to drive a plurality of switches in order to control a system duty cycle, where driving the switches to increasing the system duty cycle results in a buck operation configured to charge the super-capacitors, and where driving the switches to decrease the system duty cycle results in a boost operation configured to relieve load of the battery unit. The switches can be architected in a modular and parallel configuration such that interleaved operation can be used to reduce current ripple; such interleaved operation where the current in each parallel phase can be controlled by independently commanded current controllers to increase system response time for transient loads.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 9A-D illustrate preferred embodiments of the hybrid super-capacitor/battery system for portable power application. The BA-5590 is battery-only standard portable power unit. Other power units can be applied in a similar way. FIG. 9A shows the standard BA-5590 connected to a load device. FIG. 9B illustrates a non-limiting example of the hybrid system taught here replacing the standard BA-5590 battery system. The super-capacitor/batteries are integrated into a portable power hybrid system. FIG. 9C illustrates the hybrid power system taught here but with the hybridization achieved with a standard BA-5590 connected to an external Hybrid Module, which in turn is connected to the load device. FIG. 9D illustrates the hybrid power system taught here but with the hybridization achieved with the standard BA-5590 connected to a load device, with such load device incorporating the hybridization module.

DESCRIPTION OF THE PREFERRED EMBODIMENTS

Figure 1:
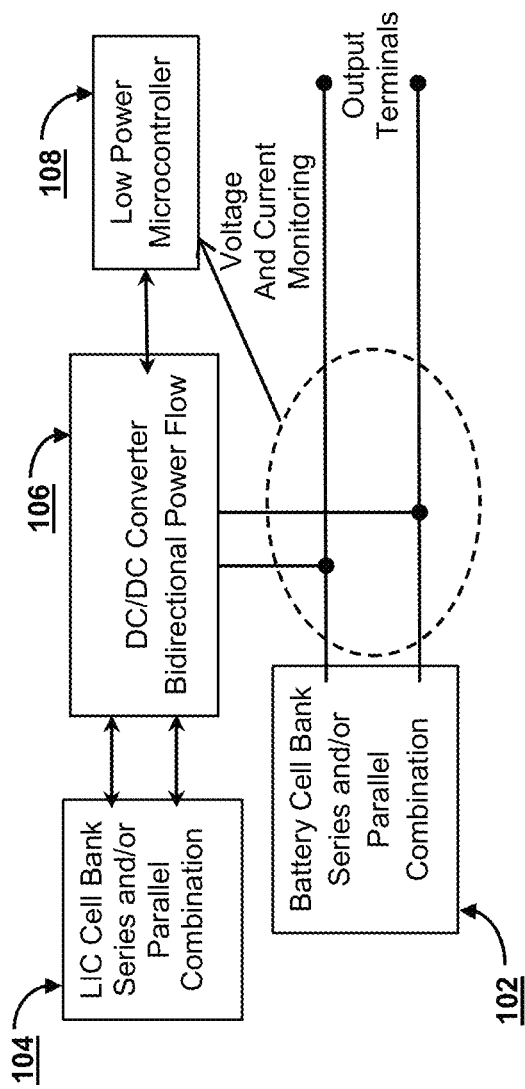
FIG. 1 illustrates a non-limiting example of a hybrid system according to the teachings of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The Hybrid Super-Capacitor/Battery System Concept

The basic idea of the hybrid super-capacitor/battery (HSCB) concept is to use the power (and other) capabilities of the super-capacitors to augment the good energy capability of batteries, and provide system performance with the best of both devices. Essentially, high-power short-duration pulses would be supplied by capacitors, while batteries would supply the overall average power and energy demands of the load. In this way, thermal stresses and energy loss are minimized in the battery. This approach will always result in greater battery capacity, lifetime and number of charge/discharge cycles. This benefit comes with the addition of super-capacitors and support circuitry, which adds cost and complexity to the system. However, depending on the application, these factors can be offset by cost, weight and space savings when the number of battery cells can be substantially reduced, as well as the future cost savings due to longer battery life. In applications where cost and space/weight are not primary concerns, the hybrid approach provides a way to keep the same number of battery cells, which allows the batteries to provide even longer runtime (i.e. greater energy capacity), while providing overall better system specifications by enhancing the pulsed power capability.

The use of both super-capacitors and battery cells, with their very different voltage levels and discharge profiles, requires a DC/DC converter system capable of bidirectional energy flow to allow both charging and discharging of the super-capacitors. This allows efficient energy transfer between the super-capacitors and battery cells, in a suitably configured system. In pulsed power applications, the use of a hybrid approach (particularly under high pulsed power and low temperature conditions) allows the existing battery system to ride through transient loading and provide excellent energy density and power density under practical loading conditions.

Figure 7:
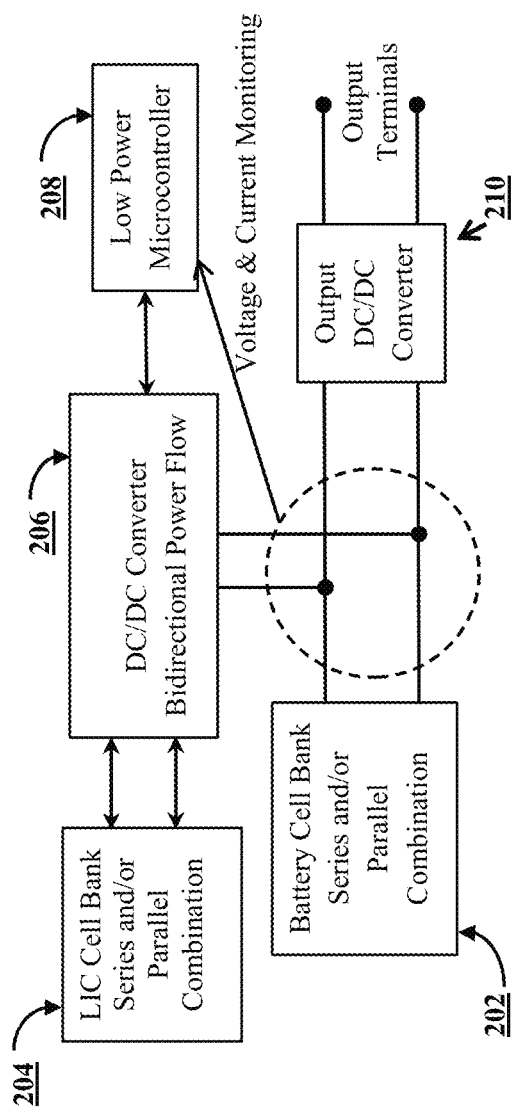
FIG. 7 illustrates a second embodiment of a non-limiting example of a hybrid system according to the teachings of the present invention with output dc/dc converter that allows a range of output load voltages.

FIG. 1 illustrates a block diagram of one design topology for the hybrid battery system. It should be noted that other design topologies are also possible, and that the setup depicted in FIG. 1 is provided as a non-limiting example for discussion purposes. A feature of this topology is that the battery connection is directly available to the load. In this example, the system is controlled by a microprocessor or micro controller 108, preferably an ultra-low power microprocessor or micro controller 108, which allows low power monitoring modes without significantly draining the battery energy. Once a power load is applied to the battery 102, the microprocessor or micro controller 108 quickly activates and enables an advance control mode. With monitoring of the energy states of the super-capacitor block 104 (which, in a non-limiting example, could be a Lithium Ion Capacitor (LIC) cell bank in series and/or parallel combination) and battery banks 102, as well as the temperatures, load voltages and currents, the DC/DC converter 106 is able to provide the optimum power delivery from the battery 102 and the super-capacitor block 104. When the power load-conditions are light enough, the capacitors in the super-capacitor block 104 automatically recharge, via the DC/DC converter 106 in a reverse energy flow mode. In this setup, the super-capacitor block 104 discharges in a forward energy flow mode. The microprocessor or micro controller 108 allows the incorporation of advanced decision making based on existing environmental and load conditions. FIG. 7 illustrates a block diagram of another design topology for the hybrid battery system that adds an output dc/dc converter to the topology of FIG. 1. A feature of this topology is that the output voltage of the system is not constrained by the output voltage of the Battery Cell bank and can be set by the dc/dc converter as appropriate for varied load requirements.

Importance of Advanced Control Algorithms in HSCB Systems

Hybrid use of super-capacitors with batteries, along with proper system control, will provide much improved overall power performance in pulsed power applications. From a performance point of view, there are no real disadvantages to the hybrid approach since a properly configured and controlled system will disable the super-capacitor support in circumstances when it does not provide advantages. However, this leads to a key point that proper control requires its own innovations, and useful approaches are not obvious.

To highlight this point, consider a simple control scheme in which the battery current (or alternatively a power set-point could be used) is held to a constant value by the control system. The current-set-point (or power-set-point) would be tuned to a value optimized for a given power load profile for the particular load on the particular system. This is important to make sure that the average power or total energy from the batteries is sufficient to power the load over a long period.

The reason this is important is that the batteries are the energy source and the super-capacitors are used to provide the power during the high power pulse periods. Thus, the battery output current (and power) is either used to drive the load, or to recharge the super-capacitors. If the load power is low and the super-capacitors are already fully charged, then that would be the only condition where the battery is not supplying the full current (or power) output specified by the control set-point. This approach will surely provide load leveling for the battery and give many benefits for lifetime and reliability of the system. However, if the power pulses are not large enough, then the hybrid system may waste energy (as heat in the DC/DC converter). This loss of capacity may not always be desirable, despite the other significant benefits offered.

The above effect can be explained in a simple way. Basically, the hybrid approach is able to relieve a significant amount of the heat loss in a battery (dissipated by the internal battery resistance). However, the DC/DC converter itself has its own heat loss (due to efficiency limits). In addition, the value of the peak power pulses is what determines whether the loss in the converter is less than the loss in the battery. Above a certain power pulse threshold, the hybrid approach gives more charge and energy capacity than the battery would provide on its own. However, below this threshold, the battery alone would have more charge and energy capacity.

This highlights why a more advanced control scheme can provide better overall performance when compared to a simple set-point based control scheme. The simple scheme will blindly charge and discharge the super-capacitors without regard to whether the power load profile is suitable to allow the hybrid approach to give all of the benefits, including increased charge capacity and energy capacity for the system. A more advanced control scheme would have the ability to disable the hybrid control function and allow the battery to run alone during periods where there are no power pulses or during periods where there are only low-power pulses that are not large enough to allow the hybrid approach to give the best system capacity.

Improved Control Algorithm for HSCB Systems

The hybrid battery system has two key requirements to be addressed by the system controller. First, there is a voltage specification that the output must maintain to be usable in the application. Second, there is the requirement to control and balance the battery current, while simultaneously providing the needed load current (and voltage). Due to these two requirements, the proposed control scheme is to use two feedback loops. An inner voltage control loop, operating at faster speed, provides control of the load voltage to maintain a commanded value in the required range, and (provided the limits are not violated) to further regulate the voltage near the battery output voltage, which varies in time as the battery drains. An outer current control loop, operating at slower speed provides the voltage command, when the limits are not violated, while controlling the battery current to a predetermined set-point based on the required operating conditions. It can be noted the two required functions of voltage regulation and current load leveling are both achieved with fast transient response. The current set-point is as described above, and allows the battery output to be load-leveled and allows the super-capacitors to provide the pulsed power needed by the load. If a simple constant value is used, then the system functions as described, although there is a possibility for small power pulses to cause the hybrid system to have lower charge- and energy-capacity than the battery operating alone. However, an improvement to the control system can be made by having hysteresis in the current set-point. This means that two values are specified and the controller does not allow the super-capacitors to power the load unless the load current is above the higher set-point value. Then, the controller does not allow the super-capacitors to be recharged until the load power is below the lower set-point value. In this way, the hybrid system can only operate when it will provide improved charge-capacity and improved energy capacity in comparison to the battery operating alone.

Note that the system could be operated with a single control loop regulating the battery current only. This works and will (in principle) maintain both current and voltage to the proper levels. However, due to controller bandwidth limits and the greater difficulty in controlling current at high speed, there is significant risk of the single controller transient response allowing the voltage to violate the specified voltage limits, since this method provides no ability to monitor and control the voltage directly. Basically, a dual feedback loop offers advantages over a direct control of current with one feedback loop. The voltage control loop is easier to operate at faster speed, and there is a need to meet voltage specifications during transients, and this requirement overrides any longer term requirement to balance current loading. The super-capacitor energy is more than sufficient to handle short-term current surges to help keep voltage under control, and any voltage dip limit at the load defines an immediate failure of the system. If direct current control is used, there is no guarantee that transients won't allow the output voltage to go outside the allowed specifications The typical transient response time of the voltage control loop should be adequate to maintain the load voltage range.

Figure 2:
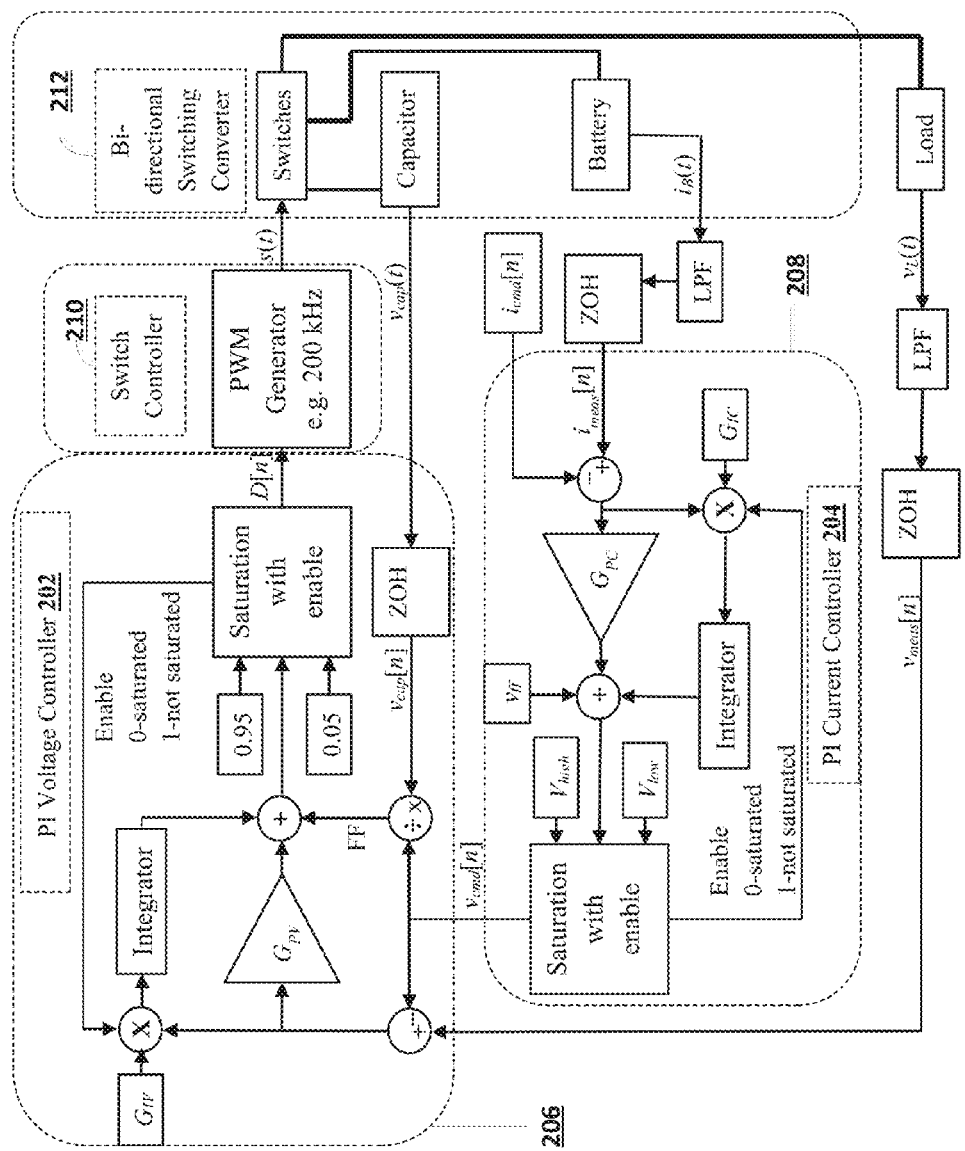
FIG. 2 depicts an overview of the system feedback control model for forward boost, reverse buck converter.

FIG. 2 depicts a block diagram of the proposed dual voltage/current feedback loop. The diagram indicates that the controller is a digital discrete time system with discrete time indicated by n. A moderately high-speed PWM frequency is used to provide a good compromise between the size of magnetic components and conversion efficiency. The PWM generator allows a discrete number of steps (i.e. the quantizer) and drives MOSFET switches to control the system duty cycle. The diagram shows the separate control sections for voltage and current (indicated by inner voltage control loop 206 and outer current control loop 208), and both feedback loops use PI controllers (indicated by PI Voltage Controller 202 and PI Current Controller 204), although other types of controllers can also be applied. Referencing the PI Voltage Controller subsystem 202, the blocks labeled $G_{PV}$, Integrator, and $G_{IV}$ form the PI controller 202 for the voltage control loop 206, with $G_{PV}$ being the proportional gain and $G_{IV}$ being the integral gain. Referencing the PI Current Controller subsystem 204, the blocks labeled $G_{PC}$, Integrator, and $G_{IC}$ form the PI controller for the current control loop 208, with $G_{PC}$ being the proportional gain and $G_{IC}$ being the integral gain. The blocks labeled LPF are low pass filters used prior to sampling the input signals. The ZOH blocks are zero order holds and are typical sample and hold operation of a digital controller. The Saturation with enable blocks are signal limiters that only allow the input signal to pass through the block if it is within the prescribed maximum and minimum values. Otherwise, the output of that block is limited to the maximum or minimum value allowed. The Switch Controller subsystem 210 features a PWM generator which generates varying duty cycle switching commands based on the input signal D[n]. The switching commands operate the Switches in the Bi-directional Switching Converter subsystem 212. The switches control the flow of current between the battery, super-capacitors, and load. The system monitors the capacitor bank voltage and uses it to provide a feed forward signal into the voltage controller. The battery current is monitored and used as the input measurement for the current controller, while the load voltage is monitored and used as the input measurement for the voltage controller. Relevant filtering and sampling are as shown.

Typically, the controller sample frequency $F_{control}$ would be at a multiple sub-division of the PWM frequency $F_{switch}$. It can be seen that the controller must generate the PWM signal s(t) in order to drive the switches. However, the controller itself needs to only generate the duty cycle D[n], and a PWM generator can generate the actual analog signal. The duty cycle D[n] and switch control signal s(t) are related to each other by the following mathematical formulas, noting that $n=\lfloor t \cdot F_{control} \rfloor$, where the half bracket/bar notation means the floor function, or rounding down to the lower integer value.

$$D[n] = F_{conrol} \cdot \int_{\frac{n}{F_{control}}}^{\frac{n+1}{F_{control}}} s(t) \cdot dt \Leftrightarrow s(t) = \begin{cases} 0 & \text{if}(t \cdot F_{switch} - \lfloor t \cdot F_{switch} \rfloor) \geq D[n] \\ 1 & \text{otherwise} \end{cases}$$

This system has a PWM generator that is capable of generating a particular quantization of discrete duty cycles in the range of 0 to 1. This resolution limit can introduce noticeable variation of the output control if the resolution in the quantizer is too low, hence some effort could be made to ensure adequate resolution, or allow the PWM generator to alter the duty cycle during the discrete time interval n, so that the average duty cycle takes on fraction values between the allowed resolution steps.

The command for the PWM generator is limited by a saturation-block. The limits are set at 0.05 and 0.95, but these limits are broader than needed and should actually be tuned as appropriate for the particular application. For example, a tolerance band around the feed forward value can be used. The saturation block generates an enable signal for the integrator, which halts integration if a limit is hit. The controller must also monitor several circuit variables by sampling with A/D converters at the controller rate, and each of the two controllers is digitally implemented as PI controllers, as shown. The inner voltage control loop monitors the load voltage to maintain the voltage at the value commanded by the outer current control loop. If the current control loop tries to command values outside the allowed voltage range, the saturation block limits the command (range is $V_{low}$ to $V_{high}$) and disables the integrator. The outer current control loop monitors the battery current to maintain a level current draw from the battery.

Both PI controllers also utilize a feed forward signal to improve system response but the feed forward may be omitted in less demanding control applications. The inner voltage loop uses the commanded output voltage and the value of the input capacitor voltage to estimate the typical duty cycle that would be needed to generate that output voltage under those conditions. It can be seen that the calculation of estimated duty cycle is simply the ratio of output voltage to input voltage, as is typically expected in a boost converter. The outer current control loop uses an estimated value or typical value for the commanded voltage. In this implementation, the feed forward value is just a pre-stored constant $V_{ff}$; however, a real system could keep a record of the estimated remaining battery capacity (by monitoring and integrating battery current, with considerations for temperature etc.) and use measured battery temperature, along with a formula or look-up table to estimate the expected output voltage. The outer current loop also uses a commanded current value, which can be a pre-stored value based on the expected load profile, or could be an adjustable value by the user. Essentially, a real implementation can use the microcontroller to provide additional intelligence to aid the feedback loops in performing their functions.

It should be noted that the controller in FIG. 2 has an input command value for the current-set-point indicated as $i_{cmd}$. It is this input variable that is usable for more advanced control schemes. The first level of improvement for the control is to replace the simple constant value with a value that changes between a number of different values; for two conditions an example is: a low value $i_{cmd-low}$ and a high value $i_{cmd-high}$. The low value is used when recharging the super-capacitors and the high value is used when the super-capacitors are potentially going to provide power to the load. By proper setting of these two values for a given application, the controller ensures that there is never a condition where the super-capacitors are operating in conditions that will result in lower charge-capacity and/or lower energy-capacity. The value for $i_{cmd}$ can even be used to effectively disable the converter operation under certain operating conditions in which that mode of operation can improve system efficiency. For instance, $i_{cmd}$ can be set to disable current flow from the capacitors between the high and low current-set-point thresholds so that the battery supplies the load instead of the capacitors when it is more efficient to do so. Hence, the system designer is able to configure the system for efficient operation that provides all of the benefits of a hybrid system for load leveling, reduced stress and better reliability for the battery. And, it does this without needlessly wasting battery capacity.

Additional refinements on the control can then be added by making the $i_{cmd-low}$ and $i_{cmd-high}$ set-points functions of other system variables. For example, the low current set-point, which is relevant for charging the super-capacitors, can be made a function of the super-capacitor charge voltage and it may be desirable to increase the set-point level if the capacitor voltage gets too low. This will help prevent the super-capacitors from becoming fully discharged. Hence, battery energy capacity may be sacrificed a little bit to ensure that the hybrid system capability is available when needed.

Various other control refinements can be made by utilizing the above control structure, and these details may depend heavily on the application. For example, advanced algorithms can analyze the recent load profile history to either identify expected modes of operation, or to just classify the load type. The controller settings can then be automatically adjusted based on the result. For example, if an aggressive mode of operation is predicted, then the state of charge on the capacitors may be set at a higher level than under nominal operating conditions.

Power Converter

Figure 3:
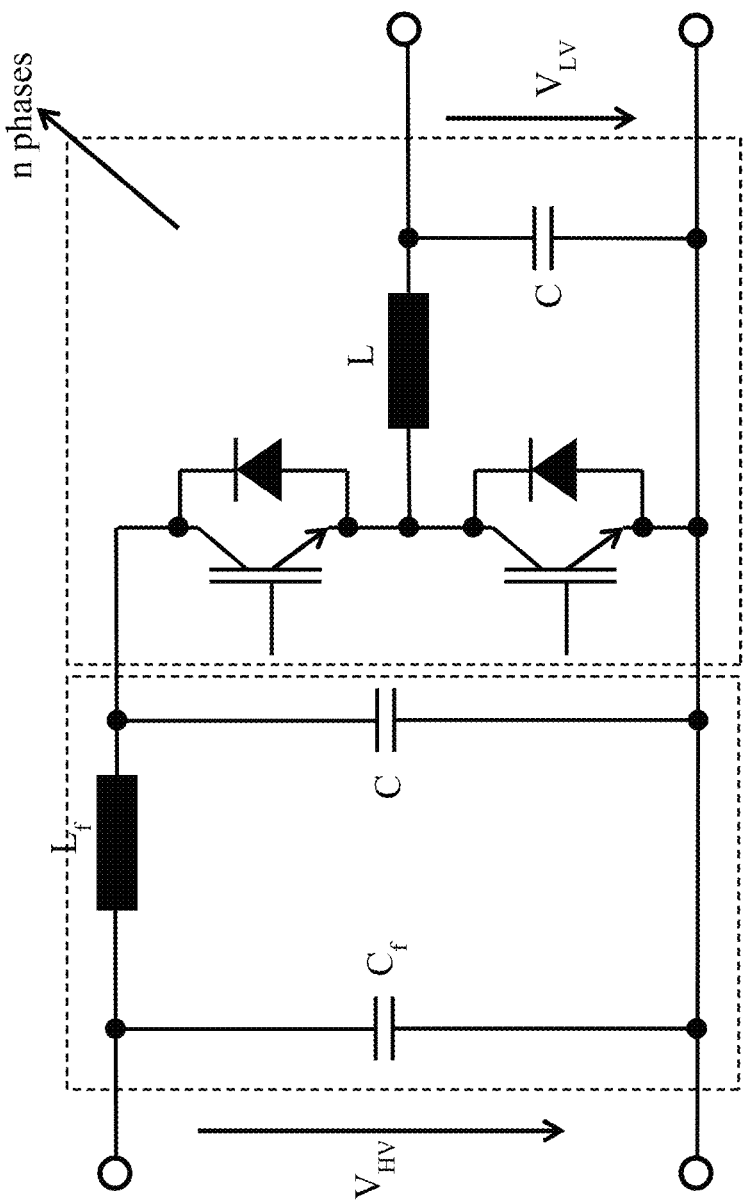
FIG. 3 illustrates the bidirectional power converter circuitry according to one embodiment of the present invention.

The Switch Controller in combination with the Switches in the Bi-directional Switching Converter subsystem in FIG. 2 form a bidirectional boost/buck dc/dc converter capable of moving energy back and forth between the internal high voltage bus and the internal low voltage bus. The converter allows maximum utilization of the stored energy in the capacitor by allowing the capacitor voltage to vary widely during discharge while maintaining a regulated bus voltage that will nominally match the battery stack voltage. FIG. 3 shows that a typical topology consists of single half bridge switching module along with appropriate filter components. The capacitor module can be connected to the low voltage side of the converter, $V_{LV}$, and the internal high voltage bus is connected to the high side of the converter, $V_{HV}$, which is typically a battery voltage stack. It should be noted that it is also possible to connect the capacitors to the high voltage side of the converter and the bus to the low voltage side if enough capacitors are stacked in series to yield a voltage larger than the bus, without changing the validity of the approaches discussed here. Operating the switches at a duty cycle that is equal to the ratio between the high and low voltage sources is the nominal balanced operation. Increasing the duty cycle results in a buck operation where current is forced into the low voltage capacitor bank from $V_{HV}$, thereby charging the capacitors. Decreasing the duty cycle will result in boost operation where current is supplied to the high voltage bus from the capacitor bank, thereby relieving load on the battery stack.

The controller can therefore alter the switch duty cycle as part of a closed loop control algorithm such that energy can be transferred to or from the high voltage bus ($V_{HV}$) and therefore it can compensate for transients on the high voltage bus. Typical efficiencies for such a converter are in the range of 94%.

Figure 4:
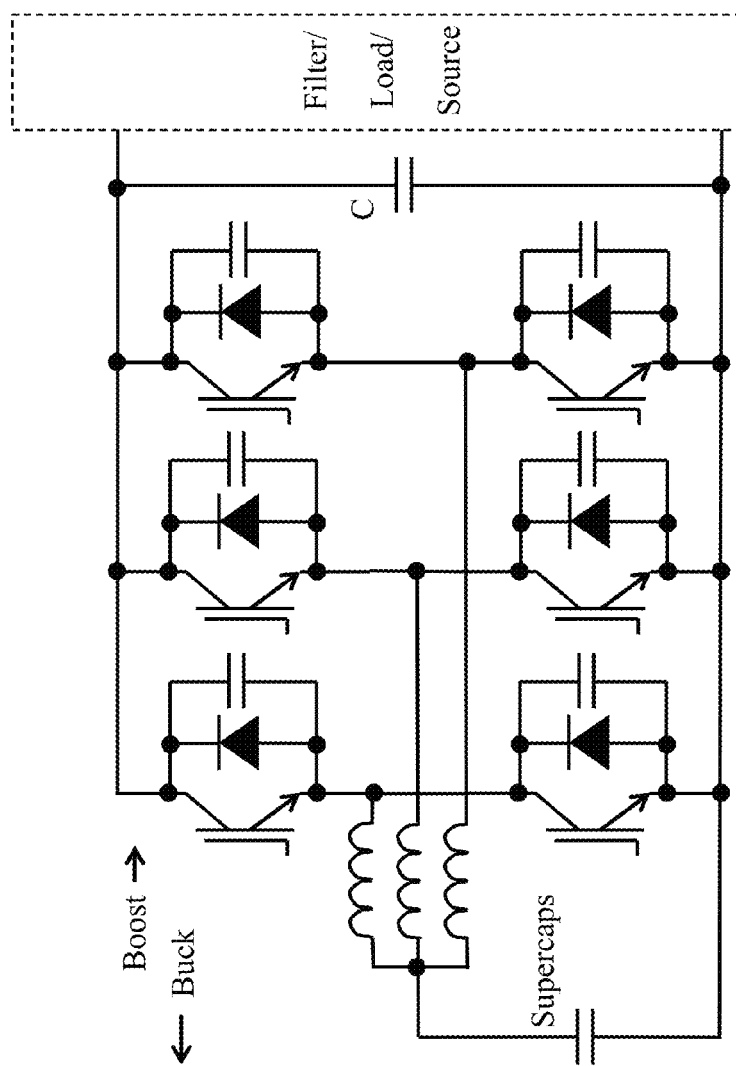
FIG. 4 illustrates the three-phase converter topology according to one embodiment of the present invention.
Figure 5:
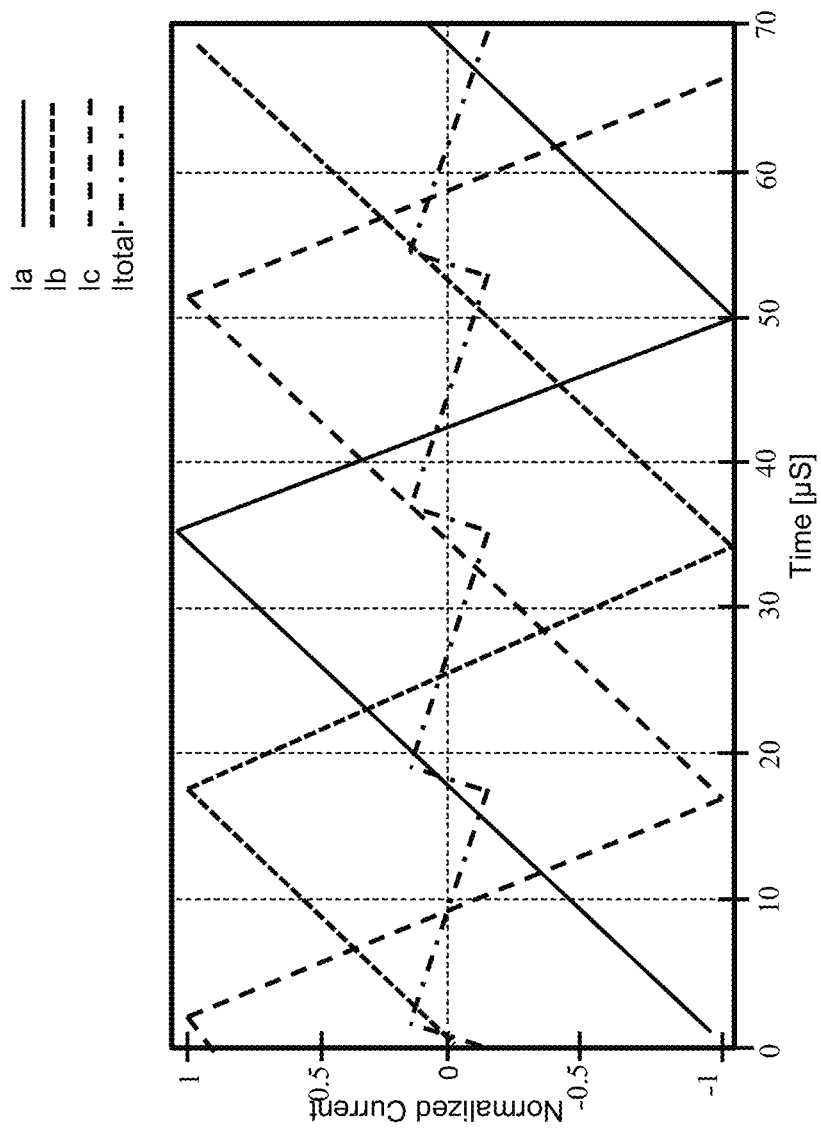
FIG. 5 illustrates the three-phase converter current waveform with interleaved operation according to one embodiment of the present invention.

The power electronics architecture is scalable in that multiple parallel phases can be added to increase power levels and distribute the capacitor output current so as not to overload a particular phase. This especially important as the capacitors discharge, since a decreasing voltage on the capacitor stack results in an increase of current through the converter for constant power internal dc bus loads. The controller can also use the parallel phases to increase the effective switching frequency of the system by synchronizing and interleaving the phases. FIG. 4 shows a three phase, two level, converter and FIG. 5 shows the interleaved and resulting total current waveforms. The total current waveform has significantly reduced current ripple and the ripple frequency has been increased by a factor of three. This reduces the amplitude of the harmonics and increases their frequency which is more easily removed by the filtering components in the converter. Further increasing the number of phases will further increase the effective switching frequency. In addition, the additional phases can be commanded independently by a high bandwidth controller, thereby increasing the response time of the system to transient loading.

Switch Controller

There are a number of switch control configurations that can be investigated for this application. One of the simplest methods is shown in FIG. 2. The output of the Voltage Controller, D[n], is input to a PWM block that quantizes the signal and pulse width modulates it to yield signal s(t) that is suitable to operate the switches in the Power Converter, thereby regulating the battery current and the bus voltage. The need for a fast response to transients is addressed by a combination of feed forward and feedback control found in the Voltage Controller and Current Controller systems.

Figure 6:
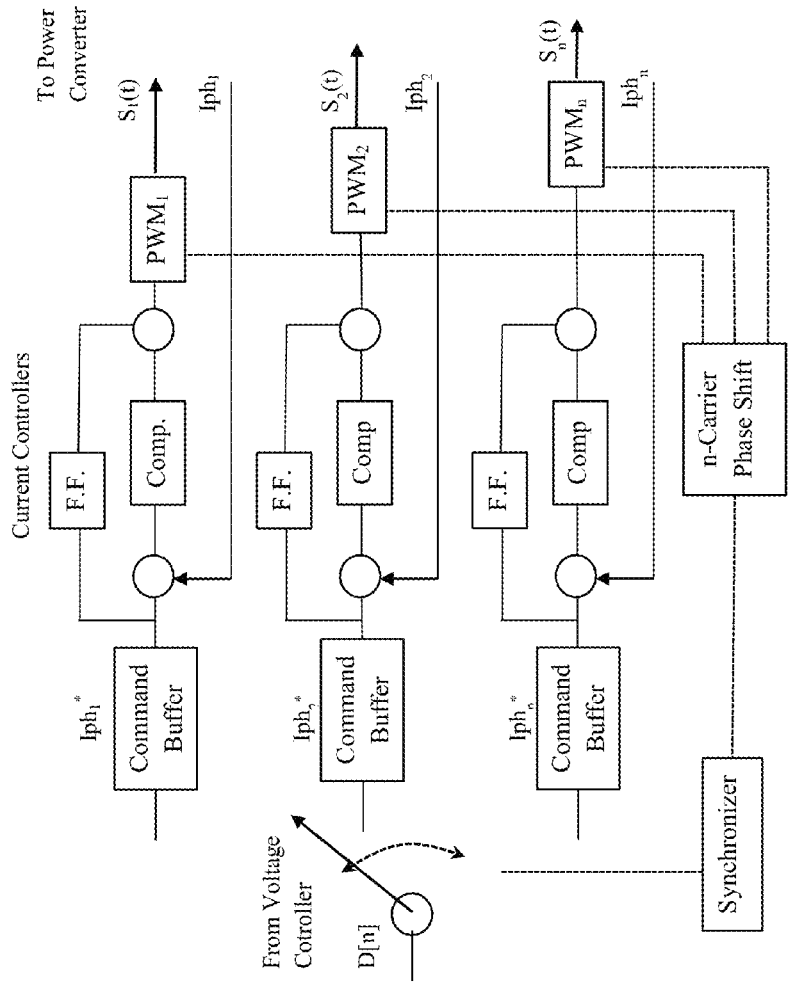
FIG. 6 illustrates the switch controller with interleaved closed loop current controllers and PWM according to one embodiment of the present invention.

Further improvement in performance can be achieved by modifying the Switch Controller to include closed loop controllers that regulate the phase current through each phase inductor, $Iph_n$, as shown in FIG. 4. In addition, in the work here, the controller can be partitioned into synchronized time slices such that each phase of the inverter can immediately respond to commanded voltage changes. In this way, the overall inverter response time is not limited by the fundamental switching frequency of the component switch. FIG. 6 is a block diagram of the control structure that illustrates the concept.

In developing the controller, for a specific application, there is a design tradeoff between the increased effective bandwidth versus the added hardware. This choice will also be affected by the type of inverter switching element, with IGBTs (about 20 kHz), and MOSFETs (>100's kHz) the industry standards, and others possible. Another advantage of the individual phase control is robustness to a failed or unbalanced phase since the command synchronizer can skip a disabled phase or adjust its gains or voltage to compensate for an unbalanced phase.

FIG. 7, as noted above, depicts a second embodiment of a non-limiting example of a hybrid system according to the teachings of the present invention with output DC/DC converter that allows a range of output load voltages. FIG. 7 illustrates a block diagram of one design topology for the hybrid battery system. A feature of this topology is that the output voltage of the system is not constrained by the output voltage of the battery cell bank 202 and can be set by the output dc/dc converter 210 as appropriate for varied load requirements.

In this example, the system is controlled by a microprocessor or micro controller 208, preferably an ultra-low power microprocessor or micro controller 208, which allows low power monitoring modes without significantly draining the battery energy. Once a power load is applied to the battery 202, the microprocessor or micro controller 208 quickly activates and enables an advance control mode. With monitoring of the energy states of the super-capacitor block 204 (which, in a non-limiting example, could be a Lithium Ion Capacitor (LIC) cell bank in series and/or parallel combination) and battery banks 202, as well as the temperatures, load voltages and currents, the DC/DC converter 206 is able to provide the optimum power delivery from the battery 202 and the super-capacitor block 204. The optimum power delivered from the super-capacitor and battery combination is input to an output DC/DC converter 210 that can boost or buck its input voltage such that its output voltage on the output terminals is adjusted to match the load. When the power load-conditions are light enough, the capacitors in the super-capacitor block 204 automatically recharge, via the DC/DC converter 206 in a reverse energy flow mode. In this setup, the super-capacitor block 204 discharges in a forward energy flow mode. The microprocessor or micro controller 208 allows the incorporation of advanced decision making based on existing environmental and load conditions.

Figure 8:
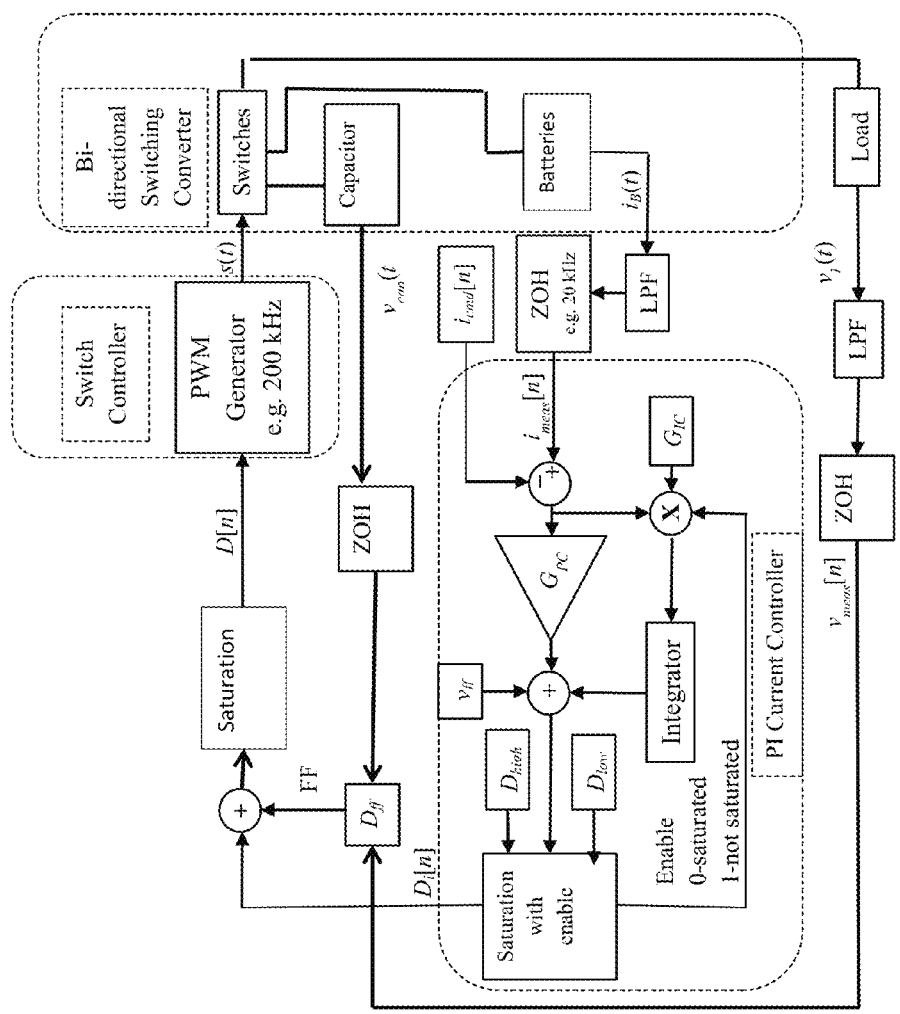
FIG. 8 depicts an overview of the system feedback control model for forward boost, reverse buck operation with outer current controller and without inner loop voltage controller.

FIG. 8 depicts an overview of the system feedback control model for forward boost, reverse buck operation with outer current controller and without inner loop voltage controller. The diagram indicates that the controller is a digital discrete time system with discrete time indicated by n. A moderately high-speed PWM frequency is used to provide a good compromise between the size of magnetic components and conversion efficiency. The PWM generator allows a discrete number of steps (i.e. the quantizer) and drives MOSFET switches to control the system duty cycle. The diagram shows the control section the current feedback loop using a PI controller, although other types of controllers can also be applied. Referencing the PI Current Controller subsystem, the blocks labeled $G_{PC}$, Integrator, and $G_{IC}$ form the PI controller for the current control loop, with $G_{PC}$ being the proportional gain and $G_{IC}$ being the integral gain. The block labeled LPF is a low pass filter used prior to sampling the input signals. The ZOH blocks are zero order holds and are typical sample and hold operations for a digital controller.

The Saturation with enable block is a signal limiter that only allows the input signal to pass through the block if it is within the prescribed maximum and minimum values. Otherwise, the output of that block is limited to the maximum or minimum value allowed. The Switch Controller subsystem features a PWM generator which generates varying duty cycle switching commands based on the input signal D[n]. The switching commands operate the Switches in the Bi-directional Switching Converter subsystem. The switches control the flow of current between the battery, super-capacitors, and load. The system monitors the capacitor bank voltage and uses it to provide a feed forward signal into the voltage controller. The battery current is monitored and used as the input measurement for the current controller, while the load voltage is monitored and used as the input measurement for the voltage controller. Relevant filtering and sampling are as shown.

Typically, the controller sample frequency $F_{control}$ would be at a multiple sub-division of the PWM frequency $F_{switch}$. It can be seen that the controller must generate the PWM signal s(t) in order to drive the switches. However, the controller itself needs to only generate the duty cycle D[n], and a PWM generator can generate the actual analog signal. The duty cycle D[n] and switch control signal s(t) are related to each other by the following mathematical formulas, noting that $n = \lfloor t \cdot F_{control} \rfloor$, where the half bracket/bar notation means the floor function, or rounding down to the lower integer value.

$$D[n] = F_{conrol} \cdot \int_{\frac{n}{F_{control}}}^{\frac{n+1}{F_{control}}} s(t) \cdot dt \Leftrightarrow s(t) = \begin{cases} 0 & \text{if} (t \cdot F_{switch} - \lfloor t \cdot F_{switch} \rfloor) \geq D[n] \\ 1 & \text{otherwise} \end{cases}$$

This system has a PWM generator that is capable of generating a particular quantization of discrete duty cycles in the range of 0 to 1. This resolution limit can introduce noticeable variation of the output control if the resolution in the quantizer is too low, hence some effort could be made to ensure adequate resolution, or allow the PWM generator to alter the duty cycle during the discrete time interval n, so that the average duty cycle takes on fraction values between the allowed resolution steps.

The command for the PWM generator is limited by a saturation-block. For example, a tolerance band around the feed forward value can be used. The saturation block generates an enable signal for the integrator, which halts integration if a limit is hit. The controller must also monitor several circuit variables by sampling with A/D converters at the controller rate, and the controller is digitally implemented as a PI controller, as shown. If the current control loop tries to command values outside the allowed duty cycle range, the saturation block limits the command (range is $D_{low}$ to $D_{high}$) and disables the integrator. The outer current control loop monitors the battery current to maintain a level current draw from the battery.

The PI controller also utilizes a feed forward signal to improve system response but the feed forward may be omitted in less demanding control applications. The inner voltage feed forward uses the measured voltage and the value of the input capacitor voltage to estimate the typical duty cycle that would be needed to generate that output voltage under those conditions. It can be seen that the calculation of estimated duty cycle is simply the ratio of output voltage to input voltage, as is typically expected in a boost converter. The current control loop uses an estimated value or typical value for the commanded voltage. In this implementation, the feed forward value is just a pre-stored constant $V_{ff}$; however, a real system could keep a record of the estimated remaining battery capacity (by monitoring and integrating battery current, with considerations for temperature etc.) and use measured battery temperature, along with a formula or look-up table to estimate the expected output voltage. The current loop also uses a commanded current value, which can be a pre-stored value based on the expected load profile, or could be an adjustable value by the user. Essentially, a real implementation can use the microcontroller to provide additional intelligence to aid the feedback loops in performing their functions.

It should be noted that the controller in FIG. 8 has an input command value for the current-set-point indicated as $i_{cmd}$. It is this input variable that is usable for more advanced control schemes. The first level of improvement for the control is to replace the simple constant value with a value that changes between a number of different values; for two conditions an example is: a low value $i_{cmd-low}$ and a high value $i_{cmd-high}$. The low value is used when recharging the super-capacitors and the high value is used when the super-capacitors are potentially going to provide power to the load. By proper setting of these two values for a given application, the controller ensures that there is never a condition where the super-capacitors are operating in conditions that will result in lower charge-capacity and/or lower energy-capacity. The value for $i_{cmd}$ can even be used to effectively disable the converter operation under certain operating conditions in which that mode of operation can improve system efficiency. For instance, $i_{cmd}$ can be set to disable current flow from the capacitors between the high and low current-set-point thresholds so that the battery supplies the load instead of the capacitors when it is more efficient to do so. Hence, the system designer is able to configure the system for efficient operation that provides all of the benefits of a hybrid system for load leveling, reduced stress and better reliability for the battery. And, it does this without needlessly wasting battery capacity.

Additional refinements on the control can then be added by making the $i_{cmd-low}$ and $i_{cmd-high}$ set-points functions of other system variables. For example, the low current set-point, which is relevant for charging the super-capacitors, can be made a function of the super-capacitor charge voltage and it may be desirable to increase the set-point level if the capacitor voltage gets too low. This will help prevent the super-capacitors from becoming fully discharged. Hence, battery energy capacity may be sacrificed a little bit to ensure that the hybrid system capability is available when needed.

Various other control refinements can be made by utilizing the above control structure, and these details may depend heavily on the application. For example, advanced algorithms can analyze the recent load profile history to either identify expected modes of operation, or to just classify the load type. The controller settings can then be automatically adjusted based on the result. For example, if an aggressive mode of operation is predicted, then the state of charge on the capacitors may be set at a higher level than under nominal operating conditions.

An application of the hybrid system is to provide a high energy high power portable power source to replace and/or enhance the performance of a standard BA-5590 battery pack. This unit is typically carried by soldiers and used to power portable devices such as communications devices. The need for high power bursts during communications, for example, are well addressed by the hybrid super-capacitor battery system. FIG. 9A shows the typical interconnection between a standard BA-5590 and a Load Device. FIG. 9B illustrates the replacement of the standard BA-5590 with the Hybrid BA-5590. Notice that the Batteries are now supplemented by the DC/DC converter and super-capacitors as described above. FIG. 9C illustrates how the hybrid system here can be used as an external enhancement to a standard BA-5590. In this implementation, the Hybridization Module is externally connected in series with the BA-5590. FIG. 9D illustrates another embodiment of the hybrid system, but with the Hybridization Module incorporated into the Load Device. In each case, the physical location of the hybrid components is changed but the overall system is the same as described above.

Figure 10:
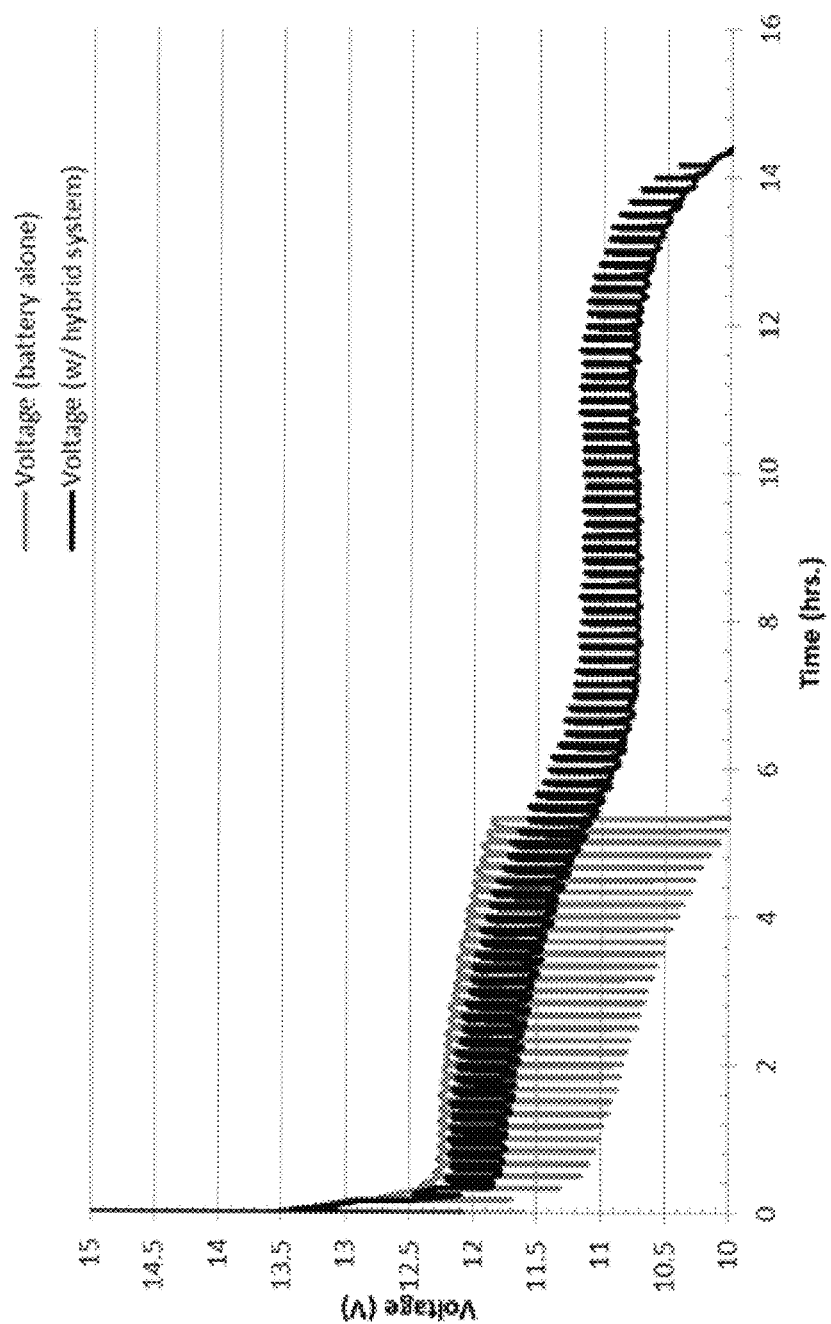
FIG. 10 illustrates the success of the hybrid super capacitor/batteries system in extending the discharge lifetime of batteries during a pulsed power load.

FIG. 10 illustrates the discharge performance improvement that can be realized using the hybrid system with a pulsed power load. The light gray plot is the output voltage of a 5-cell battery stack as compared to the black plot output voltage of a hybrid super capacitor/5 cell battery stack. The tests were performed operating at −20° C. with a nominal output voltage of 12V. This empirical data was measured for an operating system with a pulsing power load between 20 W (10% of the time) and 6 W (90% of the time), but is indicative of similar performance at higher power levels. The super capacitor is effective in providing high pulse power and is recharged from the batteries during the time that the load requires 6 W. Over time, energy is drawn from the system and the output voltage diminishes. The test is considered to be completed when the output voltage reaches 10V. It can be seen that the battery-only system is discharged in about 5 hours while the hybrid system is discharged in approximately 14 hours. The hybrid system has reduced stress on the batteries and it operates almost 3× longer than with the batteries alone.

Figure 11:
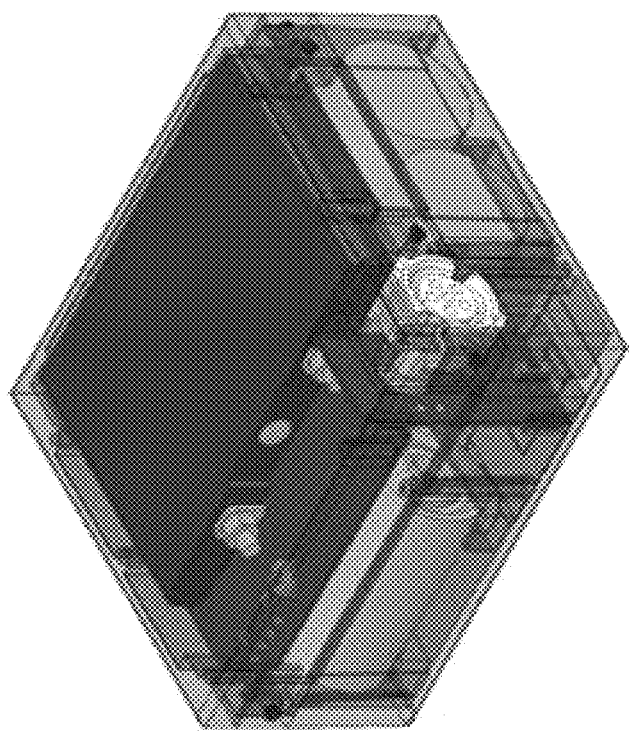
FIG. 11 shows a preferred embodiment of the hybrid super capacitor/batteries system that is the same form and fit replacement for a standard BA-5590 battery pack.

FIG. 11 illustrates a preferred embodiment of the hybrid super capacitor/batteries system that is form and fit compatible with a standard BA-5590 battery pack. This configuration corresponds to the case shown in FIG. 9B. A feature of this system is that the controller and super capacitor are field separable from the battery compartment. Once spent, the batteries can be removed and discarded while the super capacitor and control circuitry can be used again with a new set of batteries. This replacement can also be performed in the field.

It should be noted that as technology advances, the hybrid techniques and controls presented here can be applied to other combinations of sources when one source has high energy capability but lower power capability and the other source has higher power capability and lower energy capability (relative to each other). For example, another similar hybrid combination is fuel cell as the high energy source and the super capacitors as the high power source. In the following discussion, the hybrid system consists of batteries as the high energy source and super capacitors as the high power capability source. It should also be noted that the hybrid architecture is not limited to only two power sources but can be a hybrid of a multitude of power sources, each with different energy/power capabilities.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

CONCLUSION

A system and method has been shown in the above embodiments for the effective implementation of a novel design for hybrid super-capacitor/battery systems in pulsed power applications. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by specific hardware used to implement the various controllers described within this disclosure.

The invention claimed is:

1. A system comprising:
  a hybrid super-capacitor/battery system comprising a super-capacitor unit comprising one or more super-capacitors and a battery unit connected to a load, said battery unit comprising one or more battery cells rated at a battery output voltage;
  a DC/DC converter connected to said super-capacitor unit and said battery unit, said DC/DC converter allowing charging and discharging of said super-capacitors; and
  a power control system configured to reduce stresses and energy losses in said battery unit and provide improved charge-capacity and energy capacity, said power control system connected to said DC/DC converter, said power control system comprising an inner voltage control loop comprising a voltage controller and an outer current control loop comprising a current controller, said inner voltage control loop providing control of a load voltage to maintain a value of said load voltage within a predetermined range and regulating said value of load voltage to equal the battery output voltage, said outer current control loop providing said value to said inner voltage control loop and controlling a current of said battery unit to a predetermined set-point based on required operating conditions, said set point allowing output of said battery unit to be load-leveled and to allow said super-capacitor unit to provide a pulsed power needed by said load.

2. The system of claim 1, wherein said set-point is a constant value.

3. The system of claim 1, wherein said set-point comprises a set of values comprising a high set point value and a low set point value, where said power control system configured to not allow said super-capacitors to power said load unless a load current is above said high set-point value, and said power control system configured to not allow said super-capacitors to be recharged until said load current is below said low set-point value.

4. The system of claim 1, wherein said voltage controller is implemented using a proportional-integral (PI) controller.

5. The system of claim 1, wherein said current controller is implemented using a proportional-integral (PI) controller.

6. The system of claim 1, wherein said system comprises a switch controller having a pulse width modulation (PWM) generator that receives from said voltage controller a duty cycle, D[n], where D[n] is used by said PWM generator to generate a switch control signal, s(t), where s(t) is used by said PWM generator to drive a plurality of switches in order to control a system duty cycle, where driving said switches to increasing said system duty cycle results in a buck operation configured to charge said super-capacitors, and where driving said switches to decrease said system duty cycle results in a boost operation configured to relieve load of said battery unit.

7. The system of claim 6, wherein said duty cycle D[n] and said switch control signal s(t) are related to each other as follows:

$$D[n] = F_{control} \cdot \int_{\frac{n}{F_{control}}}^{\frac{n+1}{F_{control}}} s(t) \cdot dt \Leftrightarrow s(t) = \begin{cases} 0 & \text{if}(t \cdot F_{switch} - \lfloor t \cdot F_{switch} \rfloor) \geq D[n] \\ 1 & \text{otherwise} \end{cases}$$

where the half bracket/bar notation refers to a floor function or rounding down to a lower integer value.

8. The system of claim 6, wherein said switches are MOSFET switches or IGBT switches.

9. The system of claim 1, wherein said voltage controller further comprises an integrator and a saturation block having a low limit value and a high limit value, where said saturation block is configured to allow operation of said integrator as long as said value is between said low limit value and said high limit value, and said saturation block is configured to not allow operation of said integrator outside this range.

10. The system of claim 1, wherein said outer current control loop uses a predetermined value stored in a load profile as said commanded value.

11. The system of claim 1, wherein said super-capacitors are one or more of, or combinations of, the following: Electric Double Layer Capacitor (EDLC) or Lithium Ion Capacitor (LiC).

12. The system of claim 1, wherein said battery cells comprise at least one fuel cell.

13. A system comprising:
a hybrid super-capacitor/battery system comprising a super-capacitor unit comprising one or more super-capacitors and a battery unit connected to a load, said battery unit rated at a battery output voltage and comprising one or more battery cells, said super-capacitor supplying providing high-power short-duration pulses and said battery unit supplying overall average power and energy demand of a load;
a DC/DC converter connected to said super-capacitor unit and said battery unit, said DC/DC converter allowing charging and discharging of said super-capacitors;
a power control system configured to reduce stresses and energy losses in said battery unit and provide improved charge-capacity and energy capacity, said power control system connected to said DC/DC converter, said power control system comprising an inner voltage control loop comprising a voltage controller and an outer current control loop comprising a current controller, said inner voltage control loop providing control of a load voltage to maintain a value of said load voltage within a predetermined range and regulating said value of load voltage to equal the battery output voltage, said outer current control loop providing said value to inner voltage control loop and controlling a current of said battery unit to a predetermined set-point based on required operating conditions, said set point allowing output of said battery unit to be load-leveled and to allow said super-capacitor unit to provide a pulsed power needed by said load; and
a switch controller having a pulse width modulation (PWM) generator that receives from said voltage controller a duty cycle, D[n], where D[n] is used by said PWM generator to generate a switch control signal, s(t), where s(t) is used by said PWM generator to drive a plurality of switches in order to control a system duty cycle, where driving said switches to increasing said system duty cycle results in a buck operation configured to charge said super-capacitors, and where driving said switches to decrease said system duty cycle results in a boost operation configured to relieve load of said battery unit.

14. The system of claim 13, wherein said set-point is a constant value.

15. The system of claim 13, wherein said set-point comprises a set of values comprising a high set point value and a low set point value, where said power control system configured to not allow said super-capacitors to power said load unless a load current is above said high set-point value, and said power control system configured to not allow said super-capacitors to be recharged until said load current is below said low set-point value.

16. The system of claim 13, wherein said voltage controller is implemented using a proportional-integral (PI) controller.

17. The system of claim 13, wherein said current controller is implemented using a proportional-integral (PI) controller.

18. The system of claim 13, wherein said duty cycle D[n] and said switch control signal s(t) are related to each other as follows:

$$D[n] = F_{control} \cdot \int_{\frac{n}{F_{control}}}^{\frac{n+1}{F_{control}}} s(t) \cdot dt \Leftrightarrow s(t) = \begin{cases} 0 & \text{if}(t \cdot F_{switch} - \lfloor t \cdot F_{switch} \rfloor) \geq D[n] \\ 1 & \text{otherwise} \end{cases}$$

where the half bracket/bar notation refers to a floor function or rounding down to a lower integer value.

19. The system of claim 13, wherein said switches are MOSFET switches or IGBT switches.

20. The system of claim 13, wherein said voltage controller further comprises an integrator and a saturation block having a low limit value and a high limit value, where said saturation block is configured to allow operation of said integrator as long as said value is between said low limit value and said high limit value, and said saturation block is configured to not allow operation of said integrator outside this range.

21. The system of claim 13, wherein said outer current control loop uses a predetermined value stored in a load profile as said commanded value.

22. The system of claim 13, wherein said super-capacitors are one or more of, or combinations of, the following: Electric Double Layer Capacitor (EDLC) or Lithium Ion Capacitor (LiC).

23. The system of claim 13, wherein said battery cells comprise at least one fuel cell.

* * * * *